March 25, 1958 P. A. GUINARD 2,827,922
STREAM-LINED CHECK-VALVE
Filed April 22, 1954
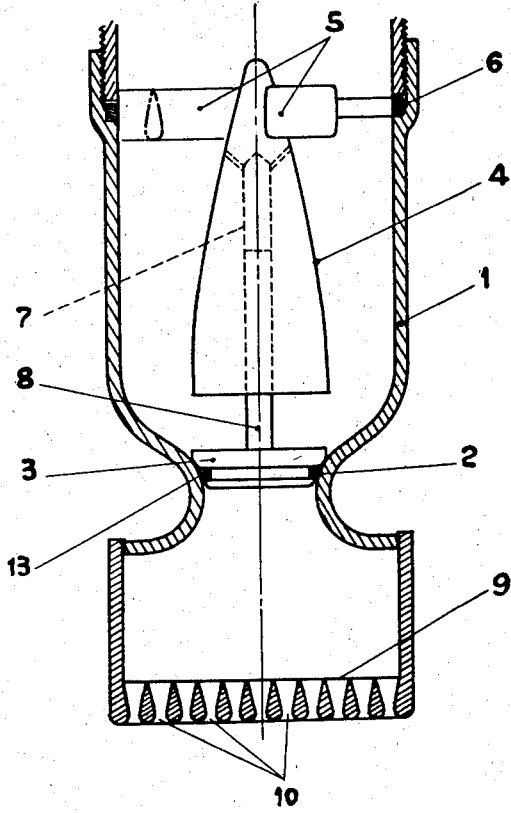
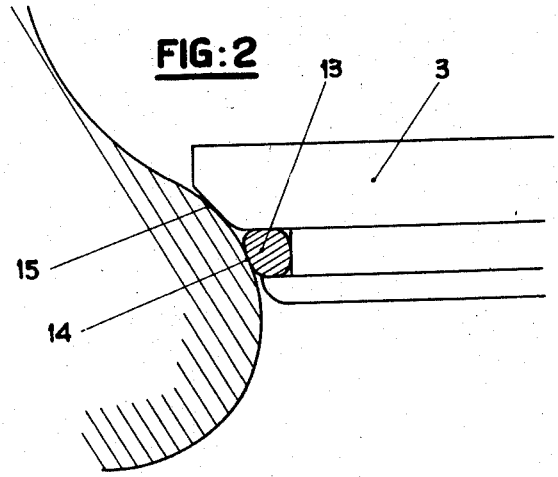
Inventor:
Paul André Guinard

United States Patent Office 2,827,922
Patented Mar. 25, 1958

2,827,922

STREAM-LINED CHECK-VALVE

Paul André Guinard, Saint-Cloud, France

Application April 22, 1954, Serial No. 425,002

Claims priority, application France December 11, 1953

2 Claims. (Cl. 137—533.21)

The present invention relates to check or suction valves provided with a basket or strainer. An object of the invention is to minimize the loss of head or pressure in such valves by improving the conditions of flow of the liquid pumped therethrough.

Another object of the invention is to provide a check valve comprising a casing of generally tubular shape having a strainer at its suction end, a seat and a valve member cooperating with said seat and arranged in a restricted part of said casing, and a diffusing member arranged in said casing aft of the valve member in the direction of liquid flow and shaped to provide in said casing an annular passage having a progressively increasing cross-sectional area.

Still another object of the invention is to provide, downstream of the valve member of a check or suction valve, a diffusing member comprising a core axially arranged in the tubular valve casing and having a downstream decreasing diameter so as to provide a progressively increasing annular passage area.

A further object of the invention is to provide a core axially arranged in the casing of a check valve aft of the valve member and having a generally frustoconical form or the form of an elongated ogive, the diameter of which decreases stream down, i. e. in the direction of flow of the liquid.

Another object of the invention is the provision of a frustoconical or ogive shaped core in the casing of a check valve, aft of the valve member, said core being fixedly arranged inside said casing or connected to the valve member and movable therewith.

Still another object of the invention is to provide a valve casing with a strainer formed by a plate having openings in the form of closely arranged converging-diverging channels, the total outlet area of said channels being substantially equal to the downstream surface area of said plate. Other particulars also included within the scope of the invention will appear in the following description given with reference to the annexed drawings, by way of example only, in which:

Figure 1 is a general elevational view in axial section of a valve according to the invention, Figure 2 is a partial section, on a larger scale, of a sealing arrangement, which is included in the valve shown in Fig. 1.

In the embodiment illustrated in Figure 1, the valve comprises a valve casing 1 in the general shape of a tubular cylinder and formed to provide a seat 2 for a flap or valve member 3. A central, ogive shaped core 4, held in position by three arms 5 and a peripheral ring 6 includes a blind hole 7 to guide the shank 8 of the valve member 3. The annular cross-sectional area of the valve between the casing 1 and the core 4 increases from the annular passage, provided between the seat 2 and the flap 3 in "valve-open" position, up to the outlet and thereby causes a reduction in head losses due to the diffusion or non-turbulent flow produced.

As illustrated in Figure 1, the strainer or basket is constituted by a plate 9 provided with channels 10 each having a general converging-diverging shape, the total area of the openings of the diverging channels at the downstream side of the plate 9 being about equal to the cross-sectional area of the plate 9. This arrangement also reduces, in a marked way, the head losses due to the strainer.

The operation of the valve above described is as follows: When suction is exerted by a pump at the upper end of the valve casing 1, the valve member is lifted till it comes in contact with the lower end of the ogive shaped diffusing member 4 and the flow of water is allowed to pass through the strainer 9 and casing 1. Due to the fact that the total outlet area of the channels 10 of the strainer is nearly equal to the cross-section area of casing 1 and that a progressively increasing passage area is provided between the ogive shaped core 4 and the surrounding wall of casing 1, the loss of head is greatly reduced and the valve unit provides high efficiency.

A preferred embodiment of the flap 3 is illustrated in Figure 2, showing on a larger scale, a detail of Figure 1. The flap 3 is combined with a toroidal sealing member 13 which by slight deformation secures a resilient seal at 14. The initial seal is enhanced, as soon as the pressure on the flap 3 is increased, by a metal to metal seal at 15. Thus, the deformation of the member 13 is limited and it can not be damaged by excess pressures.

The improved strainer can be made from metal which is stamped, forged or cast; it can also be made of a plastic material by molding.

The embodiment of the invention above described and illustrated has been given here only by way of example. Generally speaking, any modification or alternate form which does not alter the principal characteristics above outlined nor the objectives of the invention, is to be considered as included in the scope of the present invention.

What I claim is:

1. A check-valve comprising a casing of a generally cylindrical shape, a seat forming restricted part arranged in said casing having a section progressively decreasing upstream of said seat forming part and progressively increasing downstream of said seat, said section variation being continuous so as to avoid any sharp edge and to form a rounded ring-shaped restricted seat portion, a valve member cooperating with said seat and formed by a metallic disc of a substantially frustoconical downwardly tapering shape, the tapering of said disc being slightly smaller than the tapering of the part of the casing having a section increasing downstream of the seat, whereby an annular passage is formed in the open position of the valve which has a progressively increasing section, said disc having an annular groove provided with a resilient sealing ring adapted to cooperate with the lower part of the seat when the upper part of the metallic disc is applied upon the upper part of the seat, a diffusing member formed by a core axially arranged inside said casing downstream of said valve member and rigidly connected to the casing, said core having an ogive-shaped decreasing axial section to provide an annular passage having a continuously and progressively increasing area between the core and the casing downstream of said valve disc, an axial stem carried by the disc, an axial passage provided in the base of said ogive-shaped core to guide the displacement of said stem, and the upper face of the disc having a diameter equal to the diameter of the lower end of the ogive-shaped diffusing member upon which it is applied in the open position of the check-valve.

2. A check-valve comprising a casing of a generally cylindrical shape, a seat forming restricted part arranged in said casing having a section progressively decreasing upstream of said seat forming part and progressively increasing downstream of said seat, said section variation being continuous so as to avoid any sharp edge and to form a rounded ring-shaped restricted seat portion, a valve member cooperating with said seat and formed by a metallic disc of a substantially frusto-conical downwardly tapering shape, the tapering of said disc being slightly smaller than the tapering of the part of the casing having a section increasing downstream of the seat, whereby an annular passage is formed in the open position of the valve which has a progressively increasing section, said disc having an annular groove provided with a resilient sealing ring adapted to cooperate with the lower part of the seat when the upper part of the metallic disc is applied upon the upper part of the seat, a diffusing member formed by a core axially arranged inside said casing downstream of said valve member and rigidly connected to the casing, said core having an ogive-shaped decreasing axial section to provide an annular passage having a continuously and progressively increasing area between the core and the casing downstream of said valve disc, an axial stem carried by the disc, an axial passage provided in the base of said ogive-shaped core to guide the displacements of said stem, the upper face of the disc having a diameter equal to the diameter of the lower end of the ogive-shaped diffusing member upon which it is applied in the open position of the check valve, a strainer formed by a plate arranged at the inlet end of the casing upstream of the valve seat and provided with closely arranged apertures in the form of converging-diverging channels of which the total outlet section is substantially equal to the area of the plate.

References Cited in the file of this patent

UNITED STATES PATENTS

| | | |
|---|---|---|
| 608,342 | McElroy | Aug. 2, 1898 |
| 1,076,128 | Kupperle | Oct. 21, 1913 |
| 1,190,402 | Hamilton | July 11, 1916 |
| 1,212,148 | Donnelly | Jan. 9, 1917 |
| 1,466,171 | Jacobsen | Aug. 28, 1923 |
| 1,661,424 | Heine | Mar. 6, 1928 |
| 2,061,852 | Schweitzer | Nov. 24, 1936 |
| 2,107,200 | Kennon | Feb. 1, 1938 |
| 2,114,921 | Gessner | Apr. 19, 1938 |
| 2,421,329 | Hoffer | May 27, 1947 |
| 2,577,851 | Hribar | Dec. 11, 1951 |

FOREIGN PATENTS

| | | |
|---|---|---|
| 578,738 | Great Britain | July 10, 1946 |
| 959,994 | France | Oct. 17, 1949 |